United States Patent [19]
Nagaoka

[11] Patent Number: 5,641,832
[45] Date of Patent: Jun. 24, 1997

[54] ROOM TEMPERATURE-CURABLE ORGANOPOLYSILOXANE COMPOSITION

[75] Inventor: Hisayuki Nagaoka, Tokyo, Japan

[73] Assignee: Toshiba Silicone Co. Ltd., Tokyo, Japan

[21] Appl. No.: 585,434

[22] Filed: Jan. 11, 1996

Related U.S. Application Data

[63] Continuation of Ser. No. 201,222, Feb. 24, 1994, abandoned.

[30] Foreign Application Priority Data

Feb. 24, 1993 [JP] Japan ..................... 5-035353

[51] Int. Cl.$^6$ ..................... C08K 5/16
[52] U.S. Cl. ............ 524/714; 524/751; 524/754; 524/770; 524/788; 524/863
[58] Field of Search ............... 524/863, 788, 524/770, 714, 754, 751

[56] References Cited

U.S. PATENT DOCUMENTS

| | | | |
|---|---|---|---|
| 3,957,714 | 5/1976 | Clark et al. | 260/33.6 SB |
| 5,247,011 | 9/1993 | Tsuji et al. | 524/731 |

FOREIGN PATENT DOCUMENTS 0157580   10/1985   European Pat. Off. .

OTHER PUBLICATIONS

"Handbook of Fillers and Reinforcements for Plastics", Van Nostrand Reinhold Company, p. 114.

Patent Abstracts of Japan; vol. 017, No. 442 (C-1097), Aug. 16, 1993.

*Primary Examiner*—Karen A. Dean
*Attorney, Agent, or Firm*—Sughrue, Mion, Zinn, Macpeak & Seas

[57] ABSTRACT

A room temperature-curable organopolysiloxane composition is disclosed, comprising (A) 100 parts by weight of an organopolysiloxane terminated with a silanol group or an alkoxy group, (B) from 0.1 to 30 parts by weight of an organosilicon compound containing more than 2, in average, of hydrolyzable groups bonded to the silicon atom per molecule, (C) from 1 to 650 parts by weight of an oil-absorbing filler which has been prepared by impregnating (a) a porous filler with (b) a volatile organic compound which is incompatible or partly compatible to component (A) and compatible with an organic oily substance in an amount of from 1% by weight based on the weight of the porous filler up to a saturation amount and, if desired, (D) a requisite amount of a curing catalyst. The composition exhibits satisfactory adhesion to a substrate in such adhesion operation as an FIPG system without requiring wiping of organic oily contaminants on the substrate, such as hydrocarbon oils, e.g., a rust preventing oil and an engine oil.

10 Claims, 1 Drawing Sheet

ROOM TEMPERATURE-CURABLE ORGANOPOLYSILOXANE COMPOSITION

This is a Continuation of application Ser. No. 08/201,222 filed Feb. 24, 1994 abn.

FILED OF THE INVENTION

This invention relates to an organopolysiloxane composition and more particularly a room temperature-curable organopolysiloxane composition containing an oil-absorbing filler having been subjected to a specific treatment and thereby exhibiting good adhesion to a substrate with its surface contaminated with organic oily substances, such as hydrocarbon oils including a rust preventing oil and an engine oil, and therefore useful particularly as a sealing compound for forming a gasket in place.

BACKGROUND OF THE INVENTION

As the demand for heat stability of materials to be used in automobile engines increases, gaskets made of silicone rubber have been broadly used for sealing of an engine and its surroundings. In particular, formed-in-place gaskets (hereinafter referred to as "FIPG") made from a room temperature-curable liquid silicone rubber have been replacing conventional cut-to-size gaskets for ease of inventory control of gaskets, ease of process control in production of engines, and high reliability of sealing performance. The advantages of the FIPG system in workability, heat resistance, and the like are now highly estimated.

Since the engine parts to be sealed are often contaminated with organic oily substances such as hydrocarbon oils, animal or vegetable oils, and synthetic oils as in the case that a rust preventing oil is applied or that the parts are dipped in an engine oil for smooth assembly, the oily contaminants must be wiped off the surface with a cloth, etc. before FIPG sealing. However, since the organic oily substances, such as hydrocarbon oils, are not completely removed, the parts cannot be sealed completely. For example, should an oil pan with its surface contaminated be sealed by an FIPG system, cases are sometimes met with in which troubles, such as leakage of an engine oil, occurs in use. Further, while an FIPG sealing compound is automatically coated by means of a robot, the above-described wiping operation with a cloth is manually conducted, which has been a bar to automation of a series of operations.

In order to settle these problems, WO 88/500178 (unexamined published international patent application) discloses an adhesive comprising a room temperature-curable organopolysiloxane composition and an oxime(alkoxy) silylalkylurea compound as a fixing agent. However, use of such a fixing agent still fails to make the composition adhesive to an oil-contaminated surface and to solve the outstanding problems.

SUMMARY OF THE INVENTION

One object of the present invention is to provide a room temperature-curable organopolysiloxane composition which exhibits satisfactory adhesion to a substrate whose surface is contaminated with an organic oily substance, such as a hydrocarbon oil, e.g., a rust preventing oil or an engine oil, without requiring wiping operation even in an FIPG sealing system.

Another object of the present invention is to provide a method for adhering to an oil-contaminated surface of a substrate without wiping the surface clean.

As a result of extensive investigations, the present inventors have found that an oil-absorbing filler prepared by impregnating a porous filler with a volatile organic compound having more selective compatibility to an organic oily substance than to an organopolysiloxane, when compounded into a condensation cure type room temperature-curable organopolysiloxane composition, provides a composition having satisfactory adhesion even to an oil-contaminated surface of a substrate, thus meeting the above-described object. The present invention has been completed based on this finding.

The present invention relates to a room temperature-curable organopolysiloxane composition comprising (A) 100 parts by weight of an organopolysiloxane terminated with a silanol group or an alkoxy group, (B) from 0.1 to 30 parts by weight of an organosilicon compound containing more than 2, on average, of hydrolyzable groups bonded to the silicon atom per molecule, (C) from 1 to 650 parts by weight of an oil-absorbing filler which has been prepared by impregnating (a) a porous filler with from 1% by weight based on the weight of the porous filler up to a saturation amount of (b) a volatile organic compound which is incompatible or partly compatible with component (A) and compatible with an organic oily substance and, if desired, (D) a requisite amount of a curing catalyst.

BRIEF DESCRIPTION OF THE DRAWING

The FIGURE is a perspective view showing a specimen used in Examples for a shearing adhesion test. Numerals 1 and 2 are adherends of the same or different materials, 3 is an engine oil-applied surface, and 4 is an organopolysiloxane composition.

DETAILED DESCRIPTION OF THE INVENTION

Figure 1:
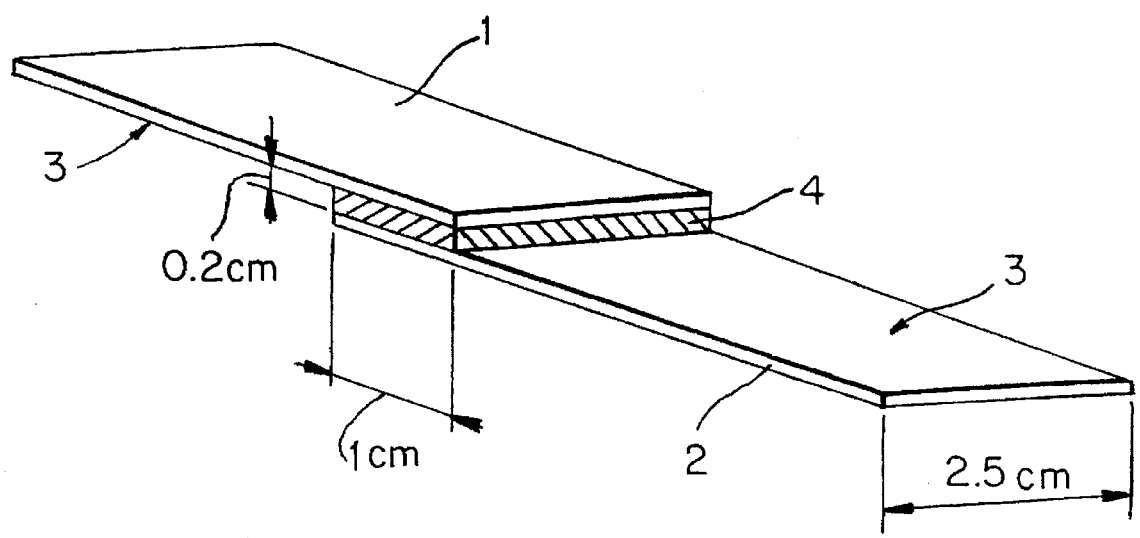

Component (A) is an organopolysiloxane terminated with a silanol group or an alkoxy group, which is generally used in condensation cure type room temperature-curable organopolysiloxane compositions. An organopolysiloxane having a viscosity between 100 and 500,000 cSt at 25° C. is preferred for assuring moderate extrudability before curing and providing a cured rubbery product with excellent mechanical properties. If the viscosity is less than 100 cSt, the resulting rubbery product tends to have insufficient mechanical characteristics. If the viscosity exceeds 500,000 cSt, the extrudability of the composition is deteriorated, and also it is difficult to obtain a uniform composition when an inorganic filler is compounded for obtaining satisfactory mechanical characteristics. A particularly preferred viscosity range is from 2,000 to 100,000 cSt.

Component (A) contains organic groups directly bonded to the silicon atoms of component (A). Examples of the organic groups include alkyl groups, e.g., a methyl group, an ethyl group, a propyl group, a butyl group, and a hexyl group; alkenyl groups, e.g., a vinyl group and an allyl group; aryl groups, e.g., a phenyl group; aralkyl groups, e.g., a 2-phenylethyl group and a 2-phenylpropyl group; and monovalent substituted hydrocarbon groups, e.g., a chloromethyl group, a β-cyanoethyl group, and a 3,3,3-trifluoropropyl group. From the standpoint of ease of synthesis, a methyl group, a vinyl group, and a phenyl group are generally advantageous. Others of the above-enumerated organic groups are recommended only where special properties, such as cold resistance, heat resistance, and oil resistance, and the like are to be imparted to the cured rubbery product. It is preferable that at least 85 mol % of all the organic groups are methyl groups. In this case, an intermediate for component (A) is prepared most easily, component (A) has the least viscosity for the degree of polymerization of siloxane, and extrudability before curing and physical properties of a cured rubbery product are well-balanced. It is more preferable that substantially all the organic groups are methyl groups. It is recommended, however, to use a phenyl group as part of the organic groups when a cured rubbery product is required to have cold resistance or heat resistance, and to use a 3,3,3-trifluoropropyl group as part of the organic groups when oil resistance is demanded.

The terminal silanol group or alkoxy group contributes to curing through reaction with a hydrolysis product of component (B). Examples of the alkoxy group are a methoxy group, an ethoxy group, and an isopropoxy group. Of these terminal groups, a silanol group or a methoxy group are preferred in view of their reactivity.

Component (B) is an organosilicon compound containing more than 2, on average, of hydrolyzable groups bonded to the silicon atom per molecule. Component (B) is hydrolyzed with moisture to become ready to undergo condensation reaction with a silanol group or an alkoxy group of component (A). The hydrolyzable groups include alkoxy groups, e.g., a methoxy group, an ethoxy group, a propoxy group, an isopropoxy group, and a butoxy group; enoxy groups, e.g., a propenoxy group; an isocyanato group; oxime groups, e.g., an acetone oxime group and a butanone oxime group; organoamino groups, e.g., a dimethylamino group, a diethylamino group, a cyclohexylamino group, and an isopropylamino group; and amide groups, e.g., an N-methylacetamide group. Halogen atoms, e.g., a chlorine atom, or acyloxy groups, e.g., an acetoxy group and a benzoxy group, may serve as hydrolyzable groups in some cases but are generally unfavorable because they generate a hydrogen halide or an acid on hydrolysis to cause corrosion and irritation.

In addition to the above-described hydrolyzable groups, component (B) contains substituted or unsubstituted hydrocarbon groups bonded to the silicon atoms thereof which are similar to the organic groups directly bonded to the silicon atoms of component (A). From the standpoint of ease of synthesis and the rate of crosslinking, an alkyl group having from 1 to 8 carbon atoms, an alkenyl group having from 2 to 5 carbon atoms, and a phenyl group are preferred as the organic groups.

Specific examples of component (B) include alkoxysilanes and partial hydrolysis condensation products thereof, e.g., methyltrimethoxysilane, vinyltrimethoxysilane, methyltriethoxysilane, vinyltriethoxysilane, ethyl orthosilicate, and propyl orthosilicate; enoxysilanes and partial hydrolysis condensation products thereof, e.g., methyltriisopropenoxysilane; isocyanatosilanes and partial hydrolysis condensation products thereof, e.g., tetraisocyanatosilane and methyltriisocyanatosilane; oxime silanes and partial hydrolysis condensation products thereof, e.g., methyltris(acetone oxime)silane, methyltris(butanone oxime)silane, and vinyltris(butanone oxime)silane; aminosilanes and partial hydrolysis condensation products, e.g., methyltris(dimethylamino)silane, methyltris(diethylamino)silane, methyltris(isopropylamino)silane, and methyltris(cyclohexylamino)silane; amidosilanes and partial hydrolysis condensation products thereof, e.g., methyltris(N-methylacetamido)silane.

The amount of component (B) usually ranges from 0.1 to 30 parts, and preferably from 0.5 to 15 parts, by weight per 100 parts by weight of component (A), while varying depending on the amount of the silanol or alkoxy group of component (A) and desired properties of a cured rubbery product. If the amount of component (B) is less than 0.1 part by weight, crosslinking does not sufficiently proceed. If it exceeds 30 parts by weight, physical properties of a cured product are deteriorated.

The oil-absorbing filler as component (C) is (a) a porous filler having been previously impregnated with from 1% by weight based on the weight of the porous filler up to a saturation amount of (b) a volatile organic compound incompatible or partly compatible with component (A) and compatible with an organic oily substance contaminating a substrate.

The saturation amount, i.e., the highest possible amount to be impregnated, is determined as follows. Volatile organic compound (b) is gradually added to a given amount of porous filler (a) with stirring by means of a tool, e.g., a spatula. At the point when filler (a) is agglomerated into masses, the amount of component (b) so far added is measured, which is divided by the sum of the added amount of component (b) and the given amount of component (a) to give a saturation amount in terms of percent by weight. While a saturation amount is generally decided by a combination of components (a) and (b), it is liable to variation on account of differences in characteristics of the components, especially component (a), depending on the kind or the grade. It is therefore necessary to determine a saturation amount for every kind or lot.

In preparation of component (C), no special means is needed for impregnation of component (a) with component (b). For example, impregnation may be carried out according to the above-described addition method as used in the measurement of a saturation amount or by a method comprising immersing component (a) in component (b), followed by filtration. The latter method is conveniently carried out by putting component (a) and a sufficient amount of component (b) for giving a thorough soak to component (a) into a sealed container, allowing the mixture to stand for a period necessary to reach to saturation (about 1 day), and separating impregnated component (a) by filtration.

The organic oily substance absorption of the composition can be controlled by not only the proportion of component (C) in the composition but also the pickup (degree of impregnation) of component (b) in component (C). Accordingly, it is necessary to vary the pickup of component (b) depending on the degree of oil contamination of an adherend substrate. In this case, component (b) is added to component (a) in an amount appropriately selected within the saturation amount. In order to conduct uniform impregnation, it is recommended that component (b) is once absorbed into component (a) to saturation by the immersion method and then excess of component (b) is removed through volatilization under stirring with an appropriate means.

Volatile organic compound (b) is absorbed in and adsorbed on porous filler (a) thereby functioning to prevent the oil absorption sites (pores) of the filler from being filled up with silicone oil, etc. during preservation. The volatile organic compound preferably has a boiling point of from 50° to 200° C. It is required therefore that the organic compound should be incompatible or partly compatible with component (A) and compatible with organic oily substances contaminating the surface of a substrate. Specific examples of such a volatile organic compound include ketones, e.g., acetone, methyl ethyl ketone, and methyl isobutyl ketone; ketoximes, e.g., acetone oxime, methyl ethyl ketoxime, and methyl isobutyl ketoxime; ethers, e.g., dioxane and tetrahydrofuran; esters, e.g., methyl acetate, ethyl acetate, propyl acetate, and butyl acetate; and hydrocarbons, e.g., benzene, toluene, xylene, n-hexane, cyclohexane, and n-heptane. Preferred of them are acetone, acetone oxime, methyl ethyl ketoxime, methyl isobutyl ketoxime, dioxane, and tetrahydrofuran. These compounds may be used either individually or in combination of two or more thereof.

Porous filler (a) is one of the components capable of absorbing oily substances and thereby contributing to development of adhesion to an oil-contaminated surface. The filler must be porous to this effect and preferably has high oil absorbability. Specific examples of such an oil-absorbing filler include diatomaceous earth, precipitated calcium carbonate, ground calcium carbonate, alumina, talc, silica gel, mica, titanium oxide, lithopone, zinc white, clay, kaolin, glass powder, gypsum, ground silica, dolomite, slate flour, and barium sulfate. These fillers may be used either individually or in combination of two or more thereof. Preferred of them are diatomaceous earth, porous calcium carbonate, and silica gel for their effects on development of adhesion to an oil-contaminated surface.

A compounding ratio of components (a) and (b) is such that the amount of component (b) is from 1% by weight based on the weight of component (a) up to a saturation amount. In general, from 1 to 200 parts by weight of component (b) is used per 100 parts by weight of component (a).

The amount of component (C) in the composition ranges from 1 to 650 parts, and preferably from 2 to 400 parts, by weight per 100 parts by weight of component (A). If it is less than 1 part, no effect of developing adhesion is produced. If it exceeds 650 parts, a cured rubbery product of the composition has reduced mechanical characteristics.

While some of the compositions of the present invention undergo curing reaction at ambient temperature without the aid of a catalyst depending on the kind of component (B), most of the compositions prefer addition of a curing catalyst as component (D) for acceleration of crosslinking. Examples of suitable curing catalysts include amine compounds, e.g., dimethylhexylamine, diethylhydroxylamine, tetramethylguanidine, and tetramethylguianidinopropyltrimethoxysilane; quaternary ammonium salts, e.g., tetramethylammonium chloride and trimethylhexylammonium chloride; organic acid metal salts, e.g., zinc octanoate and tin octanoate; organotin compounds, e.g., dibutyltin diacetate, dibutyltin dioctoate, dibutyltin dilaurate, dioctyltin dilaurate, and dibutyltin dimaleate; and titanium compounds, e.g., tetrabutyl titanate and 1,3-dioxypropanebis(ethylacetoacetato)titanium. The amount of component (D) to be used is not particularly limited. To take an instance, dibutyltin dilaurate is usually added in an amount of from 0.05 to 1 part by weight per 100 parts by weight of component (A).

In addition to the essential components (A) to (C) and optional component (D), the composition of the present invention usually contains inorganic fillers for the purpose of imparting mechanical strength or hardness to a cured rubbery product. Inorganic fillers known in the art, such as fumed silica, precipitated silica, carbon black, graphite, metal powders, and metal oxides, can be used. These inorganic fillers may be used either individually or in combination thereof. They may be used either as such or with their surface treated with an organosilicon compound, e.g., dimethyl polysiloxane, octamethylcyclotetrasiloxane or hexamethyldisilazane.

While the amount of filler used varies depending the kind of the filler or the end use of the composition, the filler is usually added in an amount of not more than 150 parts by weight per 100 parts by weight of component (A). If the amount of the filler exceeds 150 parts, the composition is not easy to handle before curing, and the resulting cured product does not have sufficient mechanical properties.

If desired, the composition may further contain adhesion improving agents, oil diluents or oil repellents.

The composition of the present invention can be prepared by mixing components (A) to (C) and, if desired, optional components, such as an inorganic filler, a catalyst, and other additives, in a moisture-free atmosphere.

The composition is preserved in a moisture-impermeable sealed container and, on use, applied to a substrate surface through a nozzle connected to the container. Otherwise, the composition is preserved in a pail and applied by means of a dispenser and a pail pump for a highly viscous material. For application in small amounts, the composition may be preserved in a cartridge and coated by means of a caulking gun. The composition thus applied to the substrate undergoes curing on contact with moisture in air when allowed to stand at ambient temperature thereby developing adhesion to the substrate even with its surface contaminated with organic oily substances. Therefore, the composition serves as an adhesive for an oil-contaminated surface in such a manner that it is applied to one of adherends, and another adherend is bonded thereon while the composition is uncured, followed by allowing to stand.

Containing component (C), the composition exhibits excellent adhesion durability to a substrate wetted with hydrocarbon oils (e.g., a rust preventing oil and an engine oil) or other organic oily substances.

The composition of the present invention is particularly effective as a FIPG sealing compound. In this case, a substrate having an organic oily substance-contaminated surface may be perfectly sealed by FIPG sealing operation without previously cleaning the contaminated substrate surface with a cloth, etc. As a result, the substrate cleaning operation can be omitted, making a great contribution to rationalization of production of engines, etc.

The present invention will now be illustrated in greater detail with reference to Examples, but the present invention should not be construed as being limited thereto. All the parts are by weight unless otherwise indicated.

EXAMPLE 1

100 Parts of dimethyl polysiloxane with the both ends thereof terminated with a silanol group and having a viscosity of 10,000 cSt at 25° C., 11 parts of fumed silica (specific surface area: about 200 $m^2/g$) having been surface-treated with dimethyldichlorosilane, and 15.5 parts of diatomaceous earth (amorphous; average particle size: 40 μm) as component (C)-(a) having been impregnated with 25 parts (corresponding to 92% of a saturation amount, 27.1 parts) of methyl ethyl ketoxime as component (C)-(b) were uniformly kneaded. In a moisture-free atmosphere, 9 parts of vinyltris(butanone oxime)silane and 0.2 part of dibutyltin dimaleate were added thereto, followed by kneading to obtain a room temperature-curable organopolysiloxane composition.

An engine oil (SAE viscosity number: 5W-30) was applied to each of an aluminum substrate and a steel substrate both having a length of 8 cm, a width of 2.5 cm, and a thickness of 0.2 cm at a spread of 0.05 g/surface. The two substrates were bonded together with the above-prepared organopolysiloxane composition with the oil-applied surfaces facing to each other to prepare a test specimen for a shearing adhesion test as shown in the FIGURE. After being aged at 20° C. and 55% RH for 7 days, the specimen was subjected to a shearing adhesion test at a pulling speed of 50 mm/min to obtain a shearing adhesive strength (LSS) and a percentage cohesive failure (CF). The results obtained are shown in Table 1. The results of the same test conducted using non-contaminated substrates are also shown in Table 1.

EXAMPLE 2 AND COMPARATIVE EXAMPLES 1 TO 3

A room temperature-curable organopolysiloxane composition was prepared in the same manner as in Example 1, except for using components (C)-(a) and -(b) as shown in Table 1. That is, in Example 2, diatomaceous earth as used in Example 1 was replaced with silica gel (spherical; average particle size: 15 μm), and methyl ethyl ketoxime as used in Example 1 was replaced with acetone. Neither component (C)-(a) nor component (C)-(b) was used in Comparative Example 1. Either one of components (C)-(a) and -(b) was used in Comparative Examples 2 and 3.

Test specimens were prepared using these compositions and tested in the same manner as in Example 1. The results obtained are shown in Table 1.

EXAMPLE 3

100 Parts of dimethyl polysiloxane with the both ends thereof terminated with a silanol group and having a viscosity of 40,000 cSt at 25° C., 18 parts of fumed silica (specific surface area: about 200 m$^2$/g) having been surface-treated with dimethyl polysiloxane, and 20 parts of diatomaceous earth (amorphous; average particle size: 20 μm) as component (C)-(a) having been impregnated with 25 parts (corresponding to 63% of a saturation amount, 39.4 parts) of dioxane as component (C)-(b) were uniformly kneaded. In a moisture-free atmosphere, 8.5 parts of methyltriisopropenoxysilane, and 0.5 part of tetramethylguianidinopropyltrimethoxysilane were added thereto, followed by kneading to obtain a room temperature-curable organopolysiloxane composition.

Eight test specimens were prepared using the resulting composition and aged in the same manner as in Example 1. Half of the specimens were dipped in an engine oil (SAE viscosity number: 10W-30) at 120° C. for 10 days for accelerated deterioration, and the other half were not. Each of the specimens was tested in the same manner as in Example 1. The results obtained were averaged and are shown in Table 2 below.

TABLE 1

| Example No. | (C)-(a) Component Kind | (C)-(a) Component Amount (part) | (C)-(b) Component Kind | (C)-(b) Component Amount (part) | 5W-30 Oil-Applied LSS (kgf/cm$^2$) | 5W-30 Oil-Applied CF (%) | Non-Oil-Applied LSS (kgf/cm$^2$) | Non-Oil-Applied CF (%) |
|---|---|---|---|---|---|---|---|---|
| Example 1 | Diatomaceous earth | 15.5 | Methyl ethyl ketoxime | 25 | 13.9 | 100 | 14.3 | 100 |
| Example 2 | Silica gel | 10 | Acetone | 18* | 14.1 | 100 | 13.9 | 100 |
| Comparative Example 1 | — | — | — | — | unmeasurable | 0 | 10.8 | 100 |
| Comparative Example 2 | Diatomaceous earth | 15.5 | — | — | 7.1 | 30 | 11.9 | 100 |
| Comparative Example 3 | — | — | Methyl ethyl ketoxime | 25 | 6.6 | 75 | 7.8 | 100 |

Note:
*Corresponding to 100% impregnation, i.e., a saturation amount of 18.0 parts.

TABLE 2

| | Adhesion | | | | | | | |
|---|---|---|---|---|---|---|---|---|
| | Non-Treated with 10W-30 Oil | | | | Deteriorated with 10W-30 Oil | | | |
| | 5W-30 Oil-Applied | | Oil-Non-Applied | | 5W-30 Oil-Applied | | Oil-Non-Applied | |
| Example No. | LSS (kgf/cm$^2$) | CF (%) | LSS (kgf/cm$^2$) | CF (%) | LSS (kgf/cm$^2$) | CF (%) | LSS (kgf/cm$^2$) | CF (%) |
| Example 3 | 15.4 | 100 | 16.1 | 100 | 12.6 | 95 | 12.8 | 100 |

EXAMPLE 4

100 Parts of dimethyl polysiloxane with the both ends thereof terminated with a methyldimethoxysilyl group and having a viscosity of 20,000 cSt at 25° C., 13.5 parts of fumed silica (specific surface area: about 180 m²/g) having been surface-treated with hexamethyldisilazane, and 25.5 parts of calcium carbonate (needle-like and porous; average particle size: 2.3 μm) having been impregnated with 36 parts (corresponding to 94% of a saturation amount, 38.3 parts) of methyl ethyl ketone were uniformly kneaded. In a moisture-free atmosphere, 4.5 parts of phenyltriethoxysilane and 0.1 part of dibutyltin dilaurate were added thereto, followed by kneading to obtain a room temperature-curable organopolysiloxane composition.

Test specimens were prepared using the resulting composition in the same manner as in Example 1, except for using a pair of glass substrates or a pair of an unsaturated polyester resin substrates and, after aging, tested in the same manner as in Example 1. The results obtained are shown in Table 3 below.

TABLE 3

| | Adhesion | | | | | | | |
|---|---|---|---|---|---|---|---|---|
| | Between Glass Plates | | | | Between Unsat. Polyester Resin Plates | | | |
| | 5W-30 Oil-Applied | | Oil-Non-Applied | | 5W-30 Oil-Applied | | Oil-Non-Applied | |
| Example No. | LSS (kgf/cm²) | CF (%) | LSS (kgf/cm²) | CF (%) | LSS (kgf/cm²) | CF (%) | LSS (kgf/cm²) | CF (%) |
| Example 4 | 13.8 | 100 | 14.3 | 100 | 13.7 | 100 | 14.1 | 100 |

While the invention has been described in detail and with reference to specific examples thereof, it will be apparent to one skilled in the art that various changes and modifications can be made therein without departing from the spirit and scope thereof.

What is claimed is:

1. A room temperature-curable organopolysiloxane composition comprising
   (A) 100 parts by weight of an organopolysiloxane terminated with a silanol group or an alkoxy group,
   (B) from 0.1 to 30 parts by weight of an organosilicon compound containing more than 2, on average, of hydrolyzable groups bonded to the silicon atom per molecule, and
   (C) from 1 to 650 parts by weight of an oil-absorbing filler which has been prepared by impregnating (a) a porous filler with (b) a volatile organic compound which is incompatible or partly incompatible to component (A) and compatible with an organic oily substance in an amount of from 1% by weight based on the weight of said porous filler up to a saturation amount, said impregnating being prior to addition of said oil absorbing filler (C) to said organopolysiloxane (A) and said organosilicone compound (B).

2. A room temperature-curable organopolysiloxane composition as claimed in claim 1, wherein said composition further comprises (D) a requisite amount of a curing catalyst.

3. A room temperature-curable organopolysiloxane composition as claimed in claim 1, wherein said organopolysiloxane has a viscosity of from 100 to 500,000 cSt at 25° C.

4. A room temperature-curable organopolysiloxane composition as claimed in claim 1, wherein said volatile organic compound has a boiling point of from 50° to 200° C.

5. A room temperature-curable organopolysiloxane composition as claimed in claim 1, wherein said volatile organic compound is selected from acetone, acetone oxime, methyl ethyl ketoxime, methyl isobutyl ketoxime, dioxane, and tetrahydrofuran.

6. A room temperature-curable organopolysiloxane composition as claimed in claim 1, wherein said porous filler is diatomaceous earth, precipitated calcium carbonate, ground calcium carbonate or silica gel.

7. A room-temperature curable organopolysiloxane composition as claimed in claim 1, wherein said filler is precipitated calcium carbonate or ground calcium carbonate.

8. A room-temperature curable organopolysiloxane composition as claimed in claim 1, wherein said filler is diatomaceous earth.

9. A room-temperature curable organopolysiloxane composition as claimed in claim 1, wherein said impregnating is accomplished by immersing said porous filler (a) in said volatile organic compound (b) followed by filtration.

10. A room-temperature curable organopolysiloxane composition as claimed in claim 1, wherein the amount of component (b) is from 1 to 200 parts by weight per 100 parts by weight of component (a).

* * * * *